No. 647,865. Patented Apr. 17, 1900.
A. PAGE.
ARTIFICIAL TOOTH.
(Application filed Oct. 14, 1898.)
(No Model.)
Fig. 1.    Fig. 2.    Fig. 3.    Fig. 4.
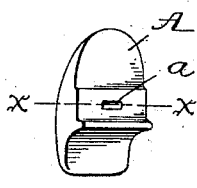 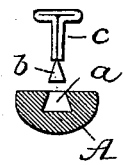 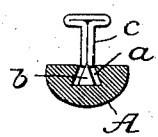 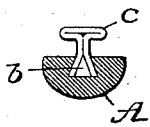
Fig. 5.    Fig. 6.
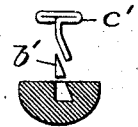 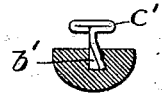
WITNESSES:
INVENTOR
Alfred Page.
BY
Thomas S. Mowles
ATTORNEY.

UNITED STATES PATENT OFFICE.

ALFRED PAGE, OF PHILADELPHIA, PENNSYLVANIA, ASSIGNOR TO THE STANDARD DENTAL MANUFACTURING COMPANY, OF SAME PLACE.

ARTIFICIAL TOOTH.

SPECIFICATION forming part of Letters Patent No. 647,865, dated April 17, 1900.

Application filed October 14, 1898. Serial No. 693,489. (No model.)

*To all whom it may concern:*

Be it known that I, ALFRED PAGE, a citizen of the United States, residing at Philadelphia, in the county of Philadelphia and State of Pennsylvania, have invented certain new and useful Improvements in Artificial Teeth, of which the following is a specification, reference being had therein to the accompanying drawings.

My invention relates to the manufacture of artificial teeth, and has special reference to the manner of securing the metal pins that are used to fasten the teeth to the vulcanite plate.

The object of my invention is to securely fasten these pins in the teeth after the teeth have been molded and burned, thus avoiding the use of platinum.

To accomplish the desired result, I form in the body of each tooth during the process of molding an undercut or dovetailed opening, into which, after the tooth has been burned, I place a metallic wedge, and over the wedge insert the shank of the pin, afterward firmly uniting the wedge and pin-shank by soldering or fusing them together. As the wedge and pin-shank, after they have been soldered together, fill the undercut opening, it will be impossible for the pin to pull out without breaking away portions of the tooth.

In the accompanying drawings, Figure 1 shows a finished tooth having therein an undercut opening. Fig. 2 is a cross-section of the tooth on line $x$ $x$ of Fig. 1 with a wedge and a bifurcated pin shown above the undercut opening. Fig. 3 is a cross-section of the tooth having the wedge in the undercut opening and the bifurcated pin in a position to be forced down over the wedge. Fig. 4 shows a section of a tooth with the wedge and pin in position and ready to be soldered together. Figs. 5 and 6 show a tooth with a modified form of the undercut opening and a pin having a single shank.

A represents a finished tooth made and burned in the usual way, but having therein the preferably-horizontal undercut opening $a$, placed in the middle of the tooth.

$b$ is a metallic wedge adapted to enter the undercut opening.

$c$ is a T-shaped pin consisting of a single piece of metal bent upon itself to form two independent legs, which legs are adapted to fit into the undercut opening $a$ over the wedge $b$ in the manner particularly shown in Fig. 4. After the pin and wedge have been adjusted in the undercut opening $a$ the shank of the pin and the wedge $b$ are soldered together by any convenient means, preferably by placing a small quantity of solder around the pin and heating the tooth and pin until the solder is melted, when it will flow downwardly into the undercut opening, filling any vacant space therein and at the same time firmly uniting the wedge to the pin-shank. The shank of the pin and the wedge $b$ are made of a size that combined they will, after being soldered together, fill the undercut opening $a$, thus forming a secure and firm connection between the pin and the tooth and making it impossible to withdraw or pull out the pin without breaking the body of the tooth.

When the bifurcated pin shown in Figs. 2, 3, and 4 is used, the lower parts of the shank are forced outwardly against the beveled sides of the undercut opening, and as all of the strain comes on these bent-over parts the solder connection between the wedge and the pin-shank need only be sufficient to hold the wedge in place in order to make a secure and firm connection between the tooth and the pin.

In the forms of undercut and pin shown in Figs. 4 and 5 it is more necessary that the wedge $b'$ and the single-shank pin $c'$ be firmly soldered together, although even in this form the bent-over shank of the pin is forced against the undercut, and the body of the tooth will resist any direct pull outward. If desired, the pin-shank may be straight and joined to the wedge $b'$ on the side opposite to that shown in Fig. 6, or two small wedge-shaped pieces may be used and the pin placed between them.

Having thus described my invention, what I claim as new, and desire to secure by Letters Patent of the United States, is—

1. An artificial tooth having an undercut opening therein, in combination with a wedge-shaped piece of metal set within said opening, and a T-shaped metallic pin consisting of a single strip of metal bent upon itself to form two independent legs, the legs of said pin adapted to fit in said opening and be spread by the wedge and permanently secured thereto, and the T-shaped head adapted to be molded in a vulcanite plate for the purpose of holding said tooth to the plate.

2. As a new article of manufacture, an artificial tooth having an undercut opening therein, a wedge-shaped piece of metal in said undercut opening and a suitable pin held in the undercut opening and having its inner end fused or soldered to the metallic wedge, the outer end being provided with a head adapted to be cast into a vulcanite plate.

3. As a new article of manufacture, an artificial tooth having an undercut opening therein, a wedge-shaped piece in said opening, and a bifurcated pin set in said opening straddle of said wedge-shaped piece, and held therein by solder or otherwise and having a head adapted to be cast in a vulcanite plate.

In testimony whereof I affix my signature in presence of two witnesses.

ALFRED PAGE.

Witnesses:
    THOS. D. MOWLDS,
    SAML. H. KIRKPATRICK.